Figure 1:
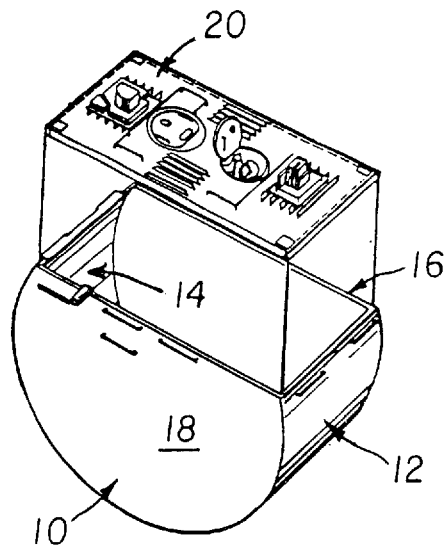
Figure 2:
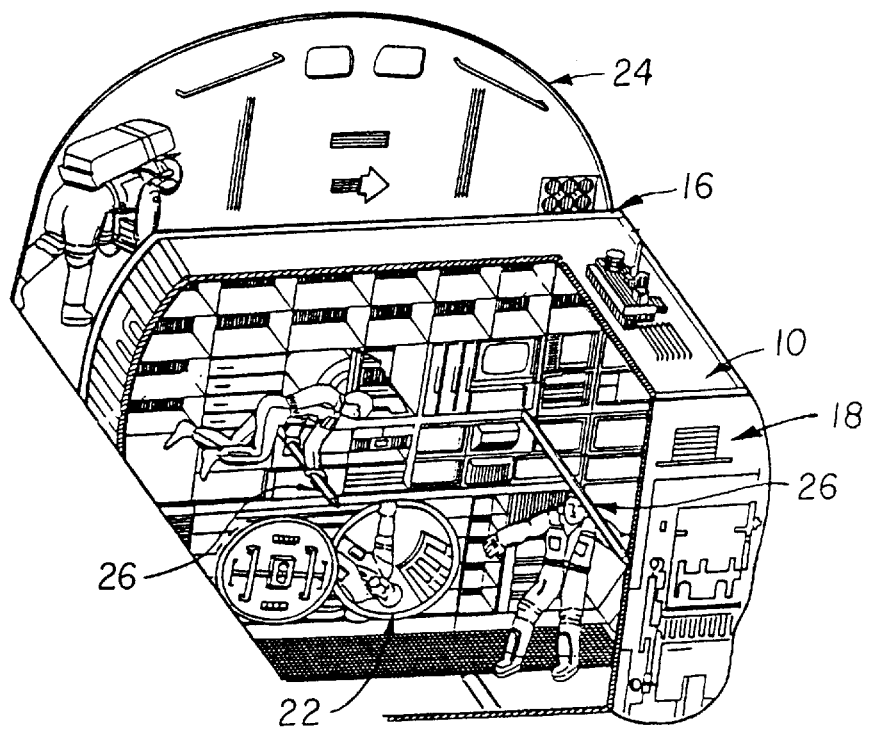

United States Patent [19]
Lounge

[11] Patent Number: 5,806,799
[45] Date of Patent: Sep. 15, 1998

[54] VARIABLE LENGTH MISSION-CONFIGURABLE MODULE FOR SPACE TRANSPORTATION VEHICLE

[75] Inventor: John M. Lounge, Seabrook, Tex.

[73] Assignee: Spacehab, Inc., Vienna, Va.

[21] Appl. No.: 401,353

[22] Filed: Mar. 9, 1995

[51] Int. Cl.⁶ ..................................................... B64G 1/10
[52] U.S. Cl. ..................................................... 244/158 R
[58] Field of Search ............................. 244/158 R, 159, 244/160, 161, 162

[56] References Cited

U.S. PATENT DOCUMENTS

| | | | |
|---|---|---|---|
| 4,132,373 | 1/1979 | Lang | 244/159 |
| 4,562,979 | 1/1986 | Taylor | 244/159 |
| 4,715,565 | 12/1987 | Whittmann | 244/158 R |
| 4,834,325 | 5/1989 | Faget et al. | 244/158 R |
| 4,867,395 | 9/1989 | Taylor | 244/158 R |
| 4,872,625 | 10/1989 | Filley | 244/159 |

*Primary Examiner*—Galen L. Barefoot
*Attorney, Agent, or Firm*—Rossi & Associates

[57] ABSTRACT

The invention provides a variable length mission configurable module that can be readily reconfigured to meet the specific pressurized space and payload requirements for a wide variety of Earth orbit missions. The module system includes a plurality of truncated body portions, a substantially flat forward bulkhead, and a substantially flat aft bulkhead. The plurality of truncated body portions and bulkheads are coupled together, wherein the forward bulkhead is located at a front end of a line of coupled truncated body portions and the aft bulkhead is located at an aft end of the coupled truncated body portions. The number of truncated body portions employed can be readily varied to adjust the overall length, pressurized volume and payload capabilities of the module system to specific mission requirements.

3 Claims, 8 Drawing Sheets

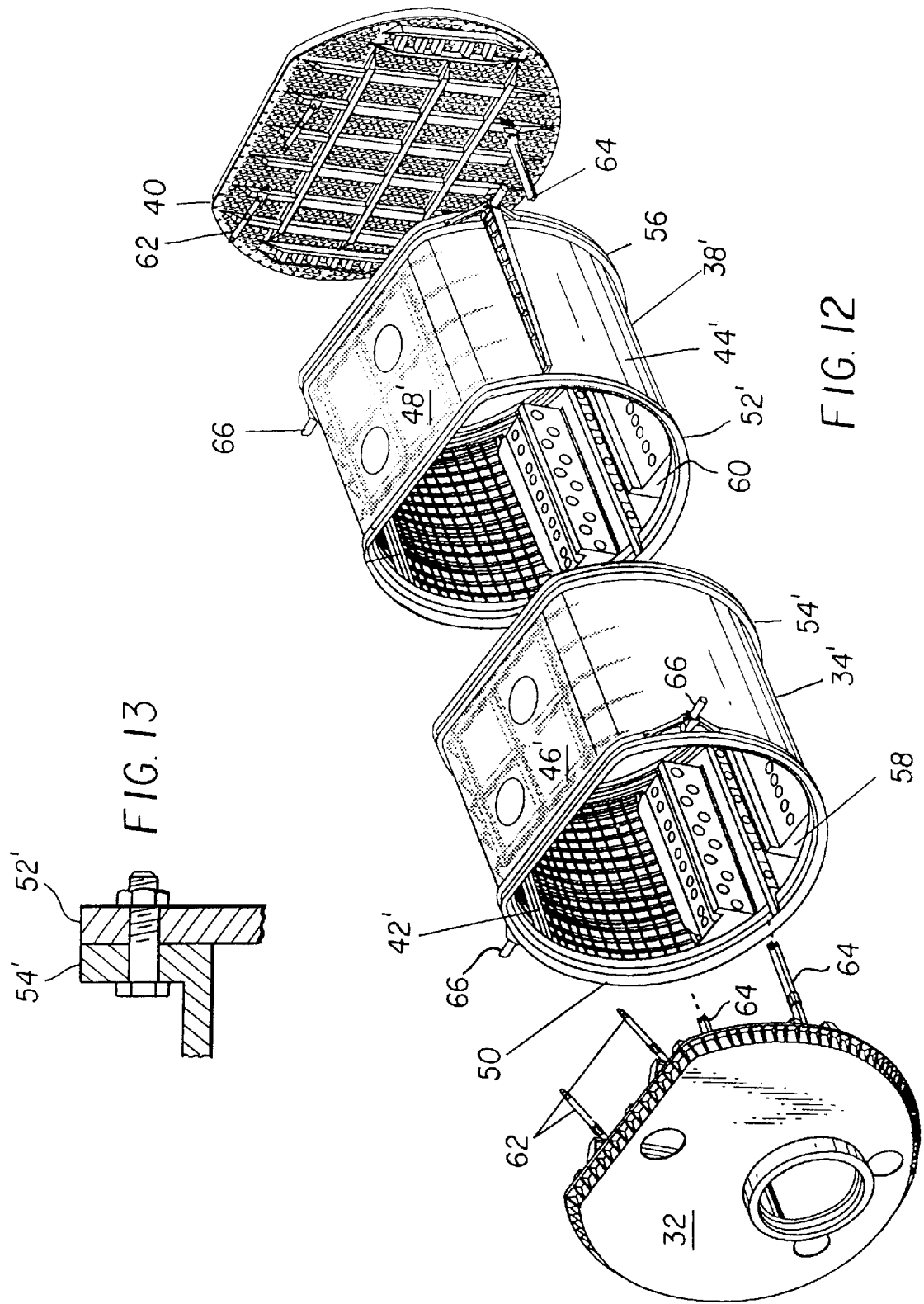

VARIABLE LENGTH MISSION-CONFIGURABLE MODULE FOR SPACE TRANSPORTATION VEHICLE

FIELD OF THE INVENTION

The present invention relates generally to modules that are designed to be positioned in a space transportation vehicle, such as the Space Shuttle Orbiter, to augment the internal pressurized volume of the space transportation vehicle and/or an orbital facility to which the vehicle is docked. The invention relates more specifically to a module having a length and pressurized volume that can be varied to meet specific payload mission requirements.

BACKGROUND OF THE INVENTION

Previous modules available for transport to Earth orbit aboard a space transportation system, such as the Space Shuttle Orbiter, include the Spacelab module and the Spacehab module. The Spacelab module requires substantially the full use of the cargo bay of the Space Shuttle Orbiter, as well as its payload capability, and is therefore generally limited to dedicated missions. The Spacehab module, as described in U.S. Pat. No. 4,867,395, the contents of which are incorporated herein by reference, was developed to some extent in response to the disadvantages associated with the Spacelab module. The truncated Spacehab module includes flat end caps and a flat top panel that permit useful payload items to be attached to the outside of the module in addition to being carried within the module. While the Spacehab module can be readily co-manifested with other payloads within the cargo bay of the Space Shuttle Orbiter, it has insufficient pressurized volume to carry all of the cargo required for certain missions, especially supply missions to facilities in highly inclined orbits such as the Mir space station or the planned International Space Station Alpha.

In view of the above, it is an object of the invention to provide a module that can be readily reconfigured to meet the specific pressurized space and payload requirements for a wide variety of Earth orbit missions.

SUMMARY OF THE INVENTION

The invention provides a variable length mission configurable module that can be readily reconfigured to meet the specific pressurized space and payload requirements for a wide variety of Earth orbit missions. The module includes a plurality of truncated body portions, a substantially flat forward bulkhead, and a substantially flat aft bulkhead. The plurality of truncated body portions and bulkheads are coupled together such that the forward bulkhead is located at a front end of a line of coupled truncated body portions and the aft bulkhead is located at an aft end of the coupled truncated body portions. The number of truncated body portions employed can be readily varied to adjust the overall length, pressurized volume and payload capabilities of the module to specific mission requirements.

BRIEF DESCRIPTION OF THE DRAWINGS

The invention will be described in greater detail below with reference to certain preferred embodiments thereof and the accompanying drawings, wherein:

FIG. 1 is a partial exploded perspective view of a conventional module as described in U.S. Pat. No. 4,867,395;

FIG. 2 is a perspective view of a spacecraft incorporating a module of the type illustrated in FIG. 1;

FIG. 3 illustrates an exploded view of a variable length mission configurable module in accordance with a first embodiment of the invention;

FIG. 4 is a diagram illustrating the application of pressure to a top panel of a conventional module of the type illustrated in FIG. 1;

FIG. 5 is a diagram illustrating the application of pressure to forward and aft bulkheads of a conventional module of the type illustrated in FIG. 1;

FIG. 6 is a diagram illustrating the combined effect of the pressure profiles illustrated in FIGS. 4 and 5 on the conventional module illustrated in FIG. 1;

FIG. 7 is a diagram illustrating the application of pressure to top panels of a module of the type illustrated in FIG. 3;

FIG. 8 is a diagram illustrating the application of pressure to forward and aft bulkheads of a module of the type illustrated in FIG. 3;

FIG. 9 is a diagram illustrating the combination of the pressure profiles illustrated in FIGS. 7 and 8 on the conventional module illustrated in FIG. 3;

FIG. 10 illustrates a front view of an adapter ring incorporated in the module illustrated in FIG. 3;

FIG. 11 illustrates a cross-sectional view, taken along line A—A in FIG. 10, of a D-ring incorporated in the adapter ring illustrated in FIG. 10;

FIG. 12 illustrates an exploded view of a variable length mission configurable module in accordance with a second embodiment of the invention;

FIG. 13 illustrates the coupling of first and second truncated body portions of the module illustrated in FIG. 12;

FIG. 14 illustrates an exploded view of a variable length mission configurable module in accordance with a third embodiment of the invention; and FIG. 15 illustrates the placement of the module illustrated in FIG. 14 into the cargo bay of a Space Shuttle Orbiter.

DETAILED DESCRIPTION OF PREFERRED EMBODIMENTS

Referring now to FIG. 1, a partial exploded perspective view of a module 10 of the type described in U.S. Pat. No. 4,867,395 is illustrated as including a truncated body portion 12 having a generally curved wall 14 to which a substantially flat forward bulkhead 16, a flat aft bulkhead 18 and a flat top panel 20 are bolted. The forward bulkhead 16 includes an opening that permits passage between the module 10 and a tunnel 22 that connects the module 10 to a pressurized crew compartment when the module 10 is loaded into the cargo bay of a Space Shuttle Orbiter 24 as shown in FIG. 2. Horizontal tie-rods 26 are provided to couple the forward bulkhead 16 directly to the aft bulkhead 18 to reduce stress due to internal pressurization and other load factors. Although not specifically illustrated in FIG. 2, diagonal tie-rods are also utilized to couple the forward bulkhead 16 and the aft bulkhead 18 to the top panel 20.

The module illustrated in FIGS. 1 and 2 was specifically designed to permit the forward bulkhead 16, the aft bulkhead 18 and the top panel 20, to be quickly and easily un-bolted from the curved wall 14 of the truncated body portion 12, thereby permitting payloads to be easily loaded and removed from the module 10. The present invention is based, in part, on the recognition that the modular design of the conventional Spacehab module could be readily expanded to permit a plurality of truncated body portions to be directly connected together, thereby permitting the overall length, pressurized volume and payload capacity of the module to be readily varied to meet specific mission requirements.

Referring now to FIG. 3, a variable length mission-configurable module 30 in accordance with the invention is illustrated as including a substantially flat forward bulkhead 32, a first truncated body portion 34, an adapter ring 36, a second truncated body portion 38 and a substantially flat aft bulkhead 40. The first and second truncated body portions 34, 38 each include a curved wall 42, 44 and a substantial flat top panel 46, 48 that are coupled to a forward D-ring 50, 52 and an aft D-ring 54, 56. A support structure 58, 60 is provided within each of the first and second truncated body portions 34, 38 to support racks containing experiments or cargo container modules. Although not specifically illustrated, various environmental controls, life support systems and avionics subsystems are preferably located in the bottom of the first and second body portions 34, 38 and are covered by a floor structure.

In a flight configuration, the forward bulkhead 32 and adapter ring 36 are respectively bolted onto the forward and rear D-rings 50, 54 of the first truncated body portion 34, the forward D-ring 52 of the second truncated body portion 38 is bolted to the adapter ring 36, and the aft bulkhead 40 is bolted to the aft D-ring 56 of the second truncated body portion 36. Diagonal tie rods 62 are provided to couple the forward bulkhead 32 and adapter ring 36 to the top panel 46 of the first truncated body portion 34, and to couple the adapter ring 36 and the aft bulkhead 40 to the top panel 48 of the second truncated body portion 38. Horizontal tie rods 64 are also provided to couple the forward and rear bulkheads 32, 40 together. Side trunnions 66, designed to fit into standard receivers provided in the cargo bay of the Space Shutter Orbiter, are bolted onto the forward D-ring 50 of the first truncated body portion 34 and the aft D-ring 56 of the second truncated body portion 38. A keel trunnion (not shown) is also provided under at least one of the first and second body portions 34, 38 to support the module 30 in the cargo bay.

Figure 3:
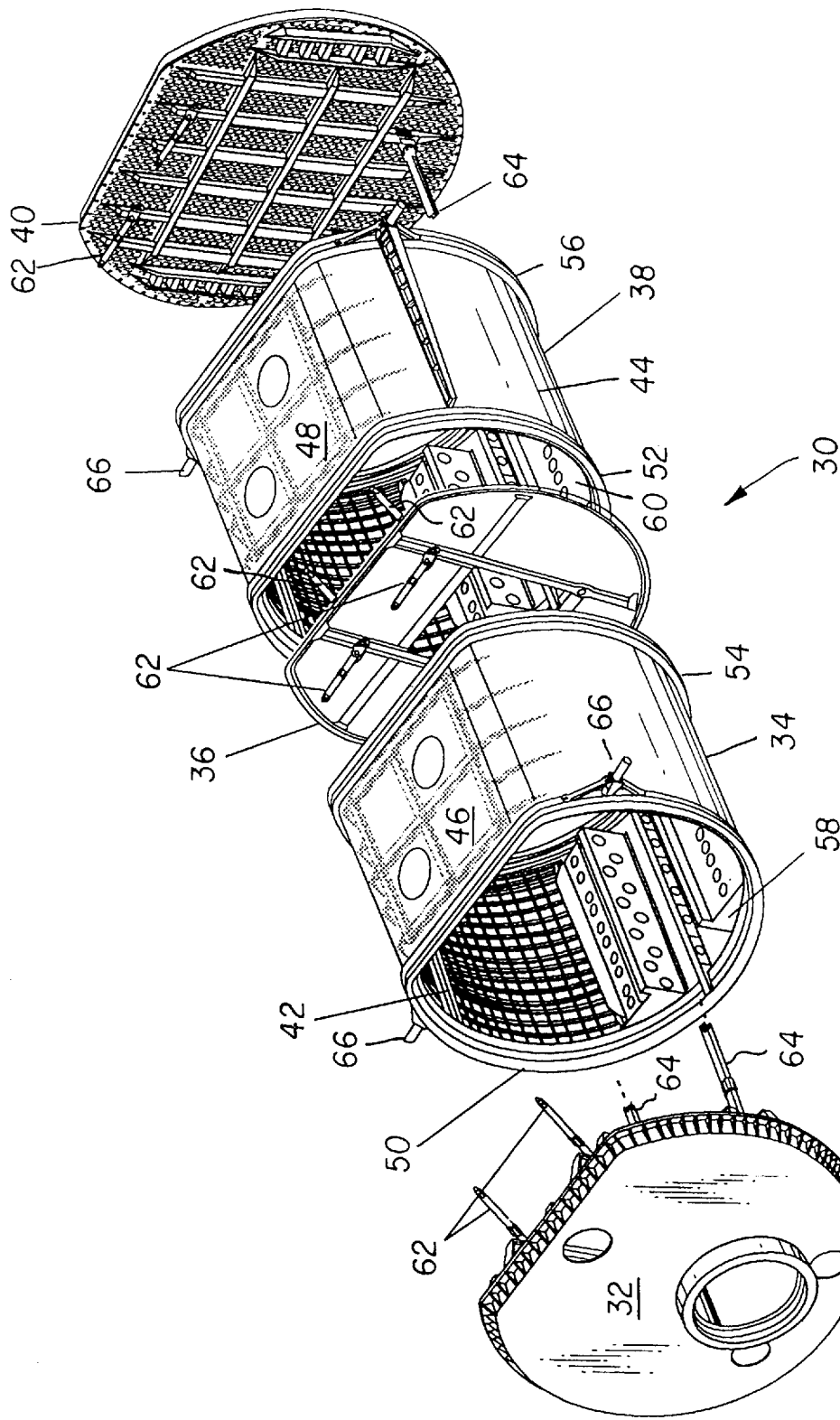
Figure 4:
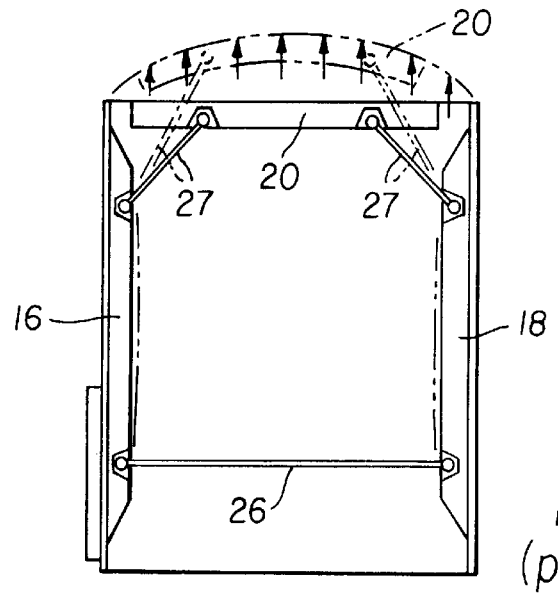
Figure 5:
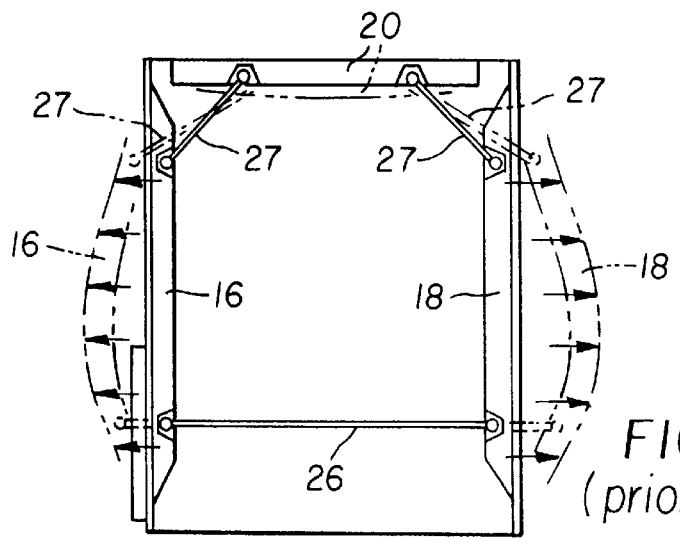
Figure 6:
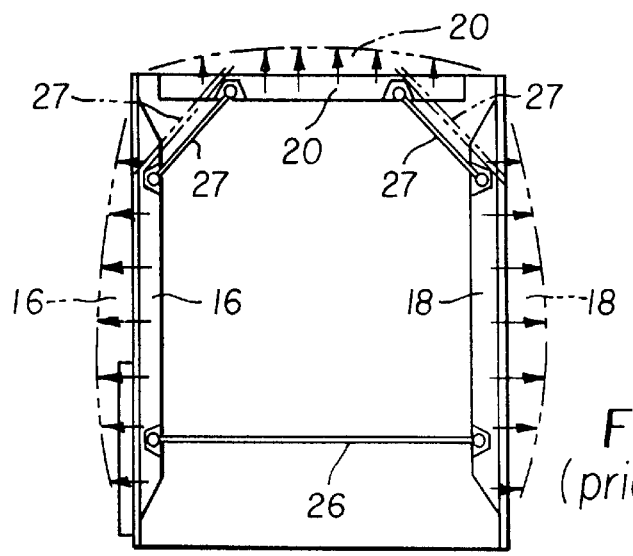
Figure 7:
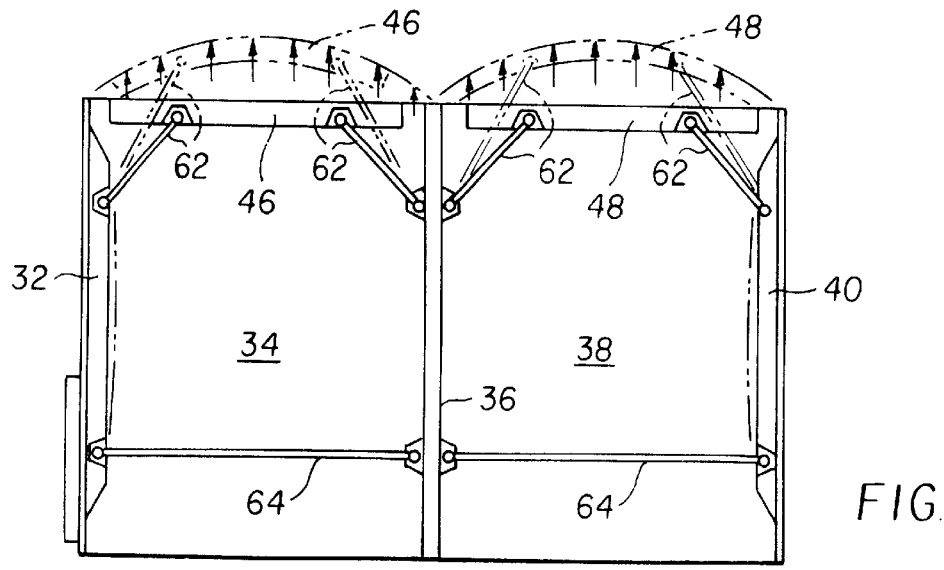
Figure 8:
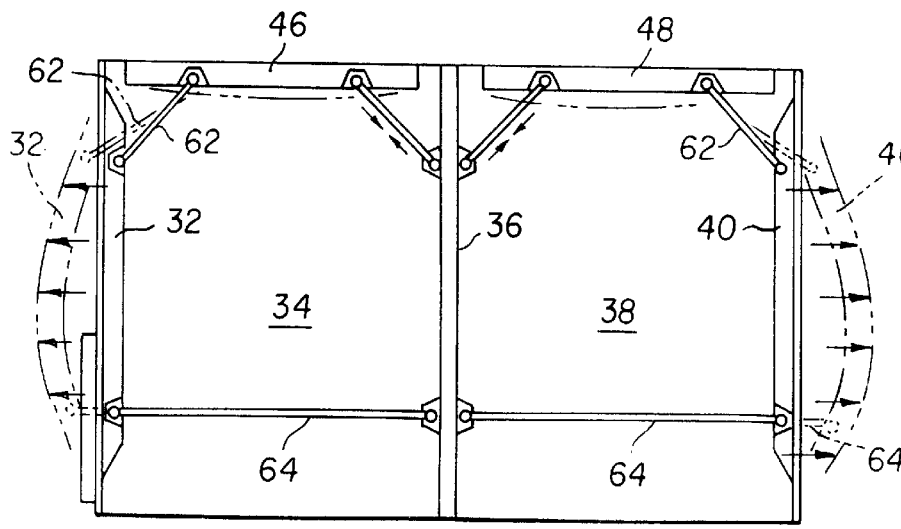
Figure 9:
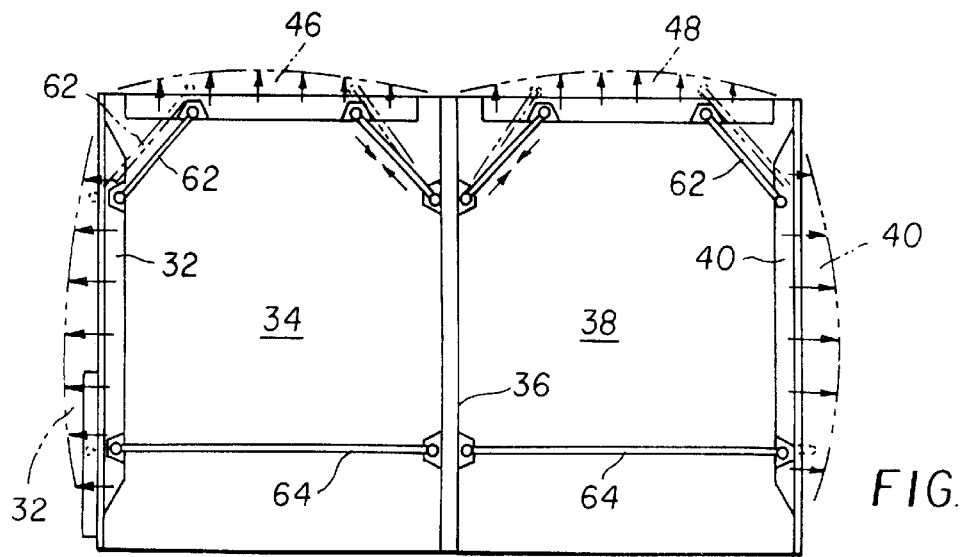

It will be recognized by those skilled in the art that the module 30 illustrated in FIG. 3 represents an unconventional pressure vessel, as the basic geometry of the module 30 includes flat forward and aft bulkheads 32, 40 and flat top panels 46, 48. The diagonal and horizontal tie rods 62, 64 help to minimize the weight of the structure by controlling the deflection of the flat surfaces due to internal pressure loads. FIGS. 4–6, for example, illustrate how the diagonal and horizontal tie rods function in a conventional single module 10 of the type illustrated in FIG. 1. FIG. 4 illustrates how the conventional module 10 reacts when pressure is applied only to the top panel 20. The top panel 20 expands and the forward and aft bulkheads 16, 18 are pulled slightly inward by diagonal tie rods 27. FIG. 5 illustrates the application of pressure only to the forward and aft bulkheads 16, 18. The forward and aft bulkheads 16, 18 are deflected outward and the top panel 20 is pulled slightly downward by the diagonal tie rods 27. By superimposing the upward deflection of the top panel 20 in FIG. 4 and the downward deflection from FIG. 5, the net impact of a fully pressurized module can be illustrated as shown in FIG. 6. The top panel 20 is not only restrained by the diagonal tie rods 27, but is actually pulled down by the diagonal tierods 27 as the forward and aft bulkheads 16, 18 deflect outward. FIGS. 7–9 illustrate equivalent deflection profiles for the module 30 illustrated in FIG. 3. As shown in FIG. 7, the behavior due to pressure applied to the top panels 46, 48 is similar to that illustrated in FIG. 4. FIG. 8 illustrates behavior due to pressure applied to the forward and aft bulkheads 32, 40. A forward section of the top panel 46 of the first truncated body portion 34 and an aft section of the top panel 48 of the second truncated body portion 38 are respectively pulled downward by the diagonal tie rods 62 attached to the forward and rear bulkheads 32, 40. The rear section of the top panel 46 and the forward section of the top panel 48, however, would not be pulled downward by the diagonal tie rods 62 attached to the adapter ring 36, as the adapter ring 36 is not subject to deflection caused by internal pressurization. The diagonal tie rods 62 attached to the adapter ring 36 are therefore preferably pre-loaded to simulate the same pull down effect on the rear section of the top panel 46 of the first truncated body portion 34 and the top panel 48 of the second truncated body portion 38 as if the first and second body portions 34, 38 where separate single modules of the type illustrated in FIG. 1. Thus, the superimposed pressure load illustrated in FIG. 9 is substantially similar for all flat surfaces for the module 30 as the pressure load illustrated in FIG. 6 for the conventional single module 10. While it is not necessary for the module 30 illustrated in FIG. 3 to have a pressure profile that is similar to the pressure profile of the conventional module 10 illustrated in FIG. 1, it is desirable to obtain a similar pressure profile to the flight proven conventional design in order to minimize the amount of testing and documentation required to certify the module 30 of present invention, for flight approval.

Figure 10:
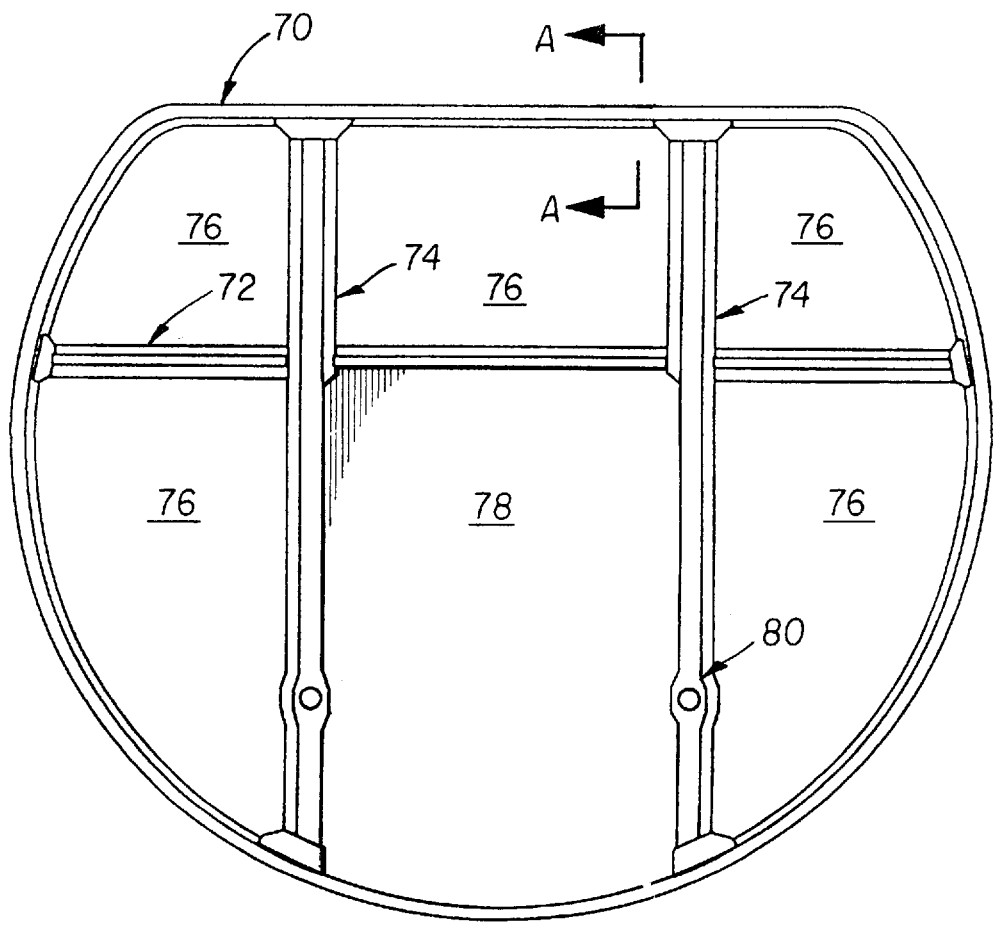
Figure 11:
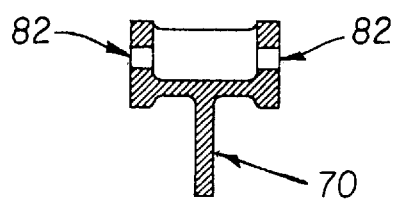

A front view of the adapter ring 36 is illustrated in FIG. 10. The adapter ring 36 includes a D-ring 70, a horizontal support member 72, two vertical support members 74 and shear panels 76 located in several spaces between the horizontal and vertical support members 72, 74 and the D-ring 70. An opening 78 is provided between the vertical support members 74 to permit access between the first and second truncated body portions 34, 38. In the illustrated embodiment, horizontal tie rod pass-through holes 80 are provided in vertical support members 74 to permit the horizontal tie rods 64 to pass from the forward bulkhead 32 to the aft bulkhead 40. As is shown in FIG. 11, the D-ring 70 includes mounting holes 82 through which bolts are passed to connect the D-ring 70 to the aft D-ring 54 of the first truncated body portion 34 and the forward D-ring 52 of the second truncated body portion 38. In addition to providing a mechanism for coupling the first and second truncated body portions 34, 38 together, the adapter ring 36 provides proper spacing for the overall module configuration to insure that the side trunnions 66 are properly located for coupling in the receivers provided in the Space Shuttle Orbiter. The additional spacing is required as the mounting positions for the side trunnions 66 would be mis-aligned with the receivers if two conventional body portions of the type illustrated in FIG. 1 were directly coupled together without providing new mounting positions for the side trunnions.

All of the components illustrated in FIG. 3, with the exception of the adapter ring 36, are conventional components that have been utilized for single module 10 configuration of the type illustrated in FIG. 1. Thus, the variable length mission configurable module 30 of the invention can be produced at a minimal cost with the addition of the adapter ring 36. It will be understood, however, that while it is preferable to utilize existing hardware to the extent possible to reduce expenses and testing required for flight approval, the invention is not limited to the use of the adapter ring 36 with conventional components, but instead, may be readily implemented by manufacturing the first and second truncated body portions 34, 38 so that they may be directly connected together without the necessity of an adapter ring 36. In such cases, the mounting positions of the side trunnions 66 or the length of the body portions would be adjusted to insure proper alignment in multiple module configurations. Additional strengthening of the curved walls 42, 44 and/or top panels 46, 48 may also be required to compensate for the loss of the diagonal tie rods 62 attached to the adapter ring 36. Alternatively, vertical tie rods coupling the top panels 46, 48 to the bottom of the first and second truncated body portions 34, 38 or floors provided therein may also be utilized. FIG. 12, for example, illustrates a second embodiment of the invention (wherein like components are designated with a prime notation) in which the first and second truncated body portions 34', 38' can be directly coupled together, by bolting the aft D-ring 54' of the first truncated body portion 34' directly to the forward D-ring 52' of the second truncated body portion 38' as shown in FIG. 13.

Figure 14:
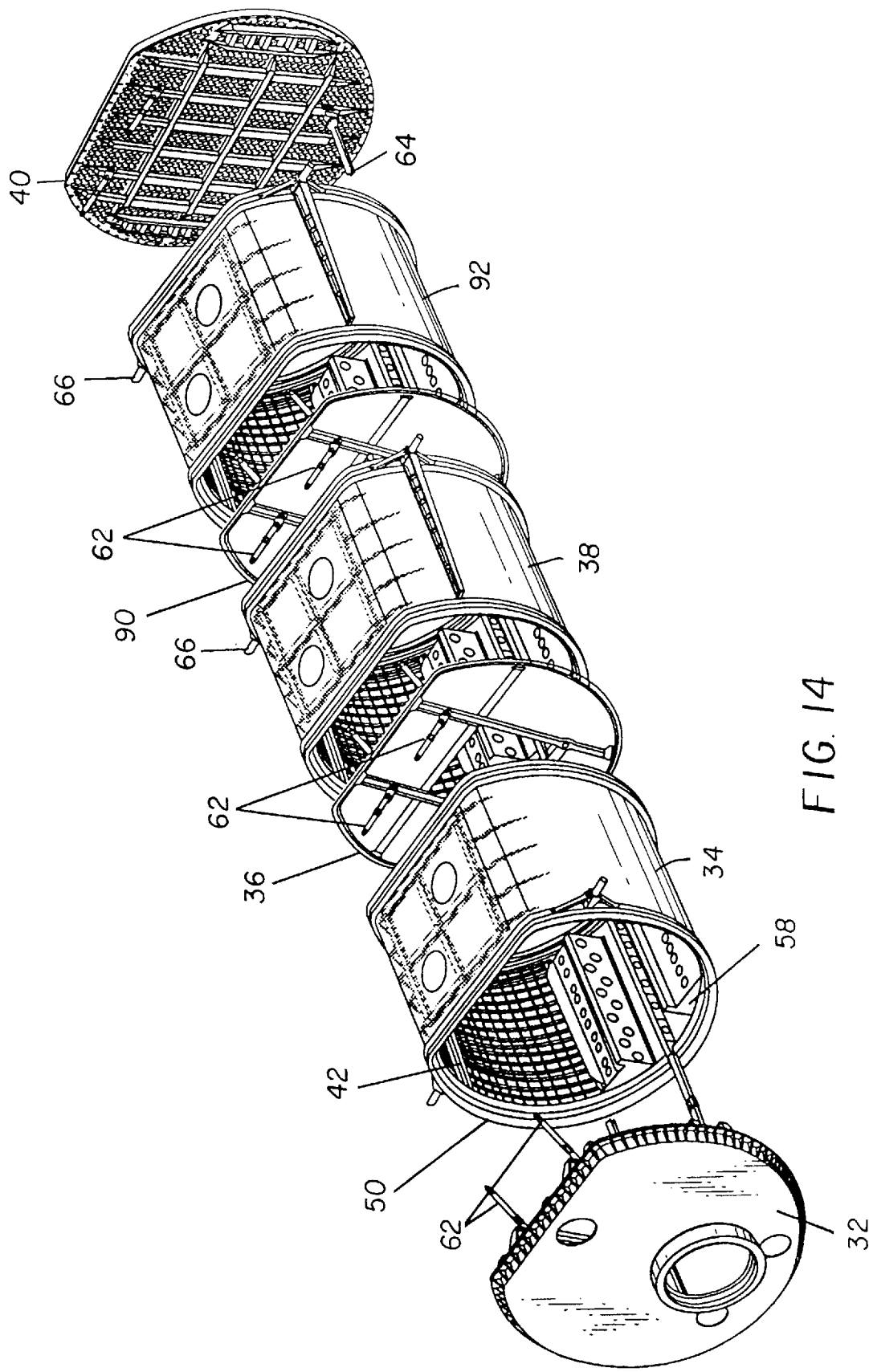
Figure 15:
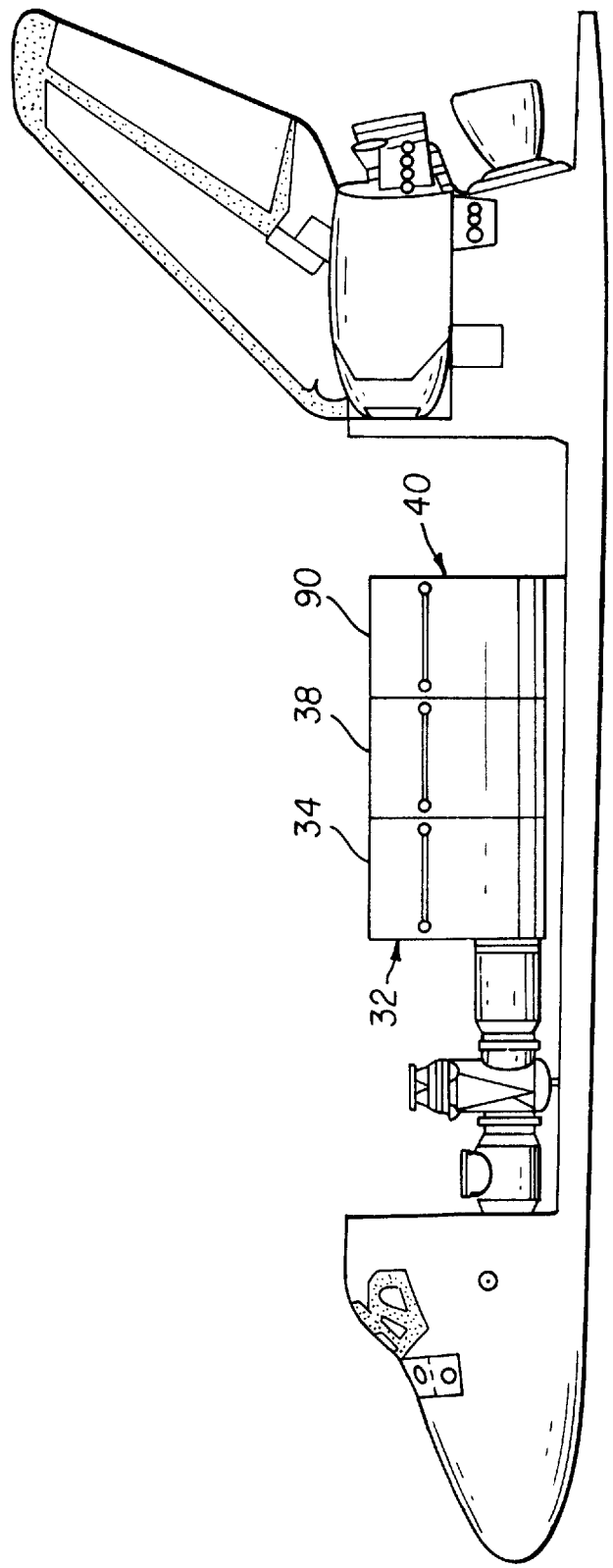

The invention has been described with reference to certain preferred embodiments thereof. It will be understood, however, that modifications and variations are possible within the scope of the appended claims. For example, the invention is not limited to the use of two truncated body portions. FIG. 14 illustrates a third embodiment of the invention in which a second adapter ring 90 (structurally identical to the adapter ring 36) is provided to couple a third truncated body portion 92 (structurally identical to the first and second body portions 34, 38) to the second truncated body portion 38 illustrated in FIG. 3. The aft bulkhead 40 is then coupled to the third truncated body portion 92. FIG. 15 illustrates the positioning of the third embodiment of the module within the cargo bay of the Space Shuttle Orbiter. Additional adapter rings and body portions may be added as desired, although an additional cabin fan is required for each body portion to maintain the required cabin air circulation velocity requirements as a result of increased module volume.

The variable length mission configurable module of the present invention has a. "dry weight" (without payload) of approximately 10,000 pounds if two body portions are utilized and approximately 13,500 pounds if three body portions are utilized. Similar, the module can structurally accommodate approximately 10,000 pounds of payload using two body portions and 13,500 pounds of payload using three body portions, subject to the structural interfaces and performance limitations of the carrier vehicle. In the case of the Space Shuttle Orbiter, it is anticipated that the payload cargo weight capacity will be reduced when using three body portions due to the added weight required by bay integration hardware, although the use of three body portions maximizes available pressurized volume for in-space research.

What is claimed is:

1. A variable length mission configurable module that is pressurized for spaceflight, said module comprising:

a first truncated body portion and a second truncated body portion, each including a curved wall and a flat top panel attached to an open end of the curved wall; a substantially flat forward bulkhead and a substantially flat aft bulkhead; and coupling means for coupling the forward bulkhead to a forward end of the first truncated body portion, an aft end of the first truncated body portion to a forward end of the second truncated body portion, and an aft end of the second truncated body portion to the aft bulkhead to form a combined module;

wherein a pressurization force is applied to the flat top panel of the first truncated body portion and the flat top panel of the second truncated body portion, the flat forward bulkhead and the flat aft bulkhead when the combined module is pressurized for spaceflight; and wherein the coupling means includes means for maintaining a pressure profile for the combined module, when the pressurization force is applied, that is substantially similar to a pressure profile of a conventional single module.

2. A variable length mission configurable module as claimed in claim 1, wherein the coupling means includes a forward D-ring and an aft D-ring located on each of the first and second truncated body portions.

3. A variable length mission configurable module as claimed in claim 1, further comprising a third truncated body portion having a forward end that is coupled to the aft end of the second body portion and an aft end that is coupled to the aft bulkhead by the coupling means.

* * * * *